US008520658B2

(12) United States Patent
Luo et al.

(10) Patent No.: US 8,520,658 B2
(45) Date of Patent: Aug. 27, 2013

(54) DEMODULATION REFERENCE SIGNALS FOR RETRANSMISSION IN WIRELESS COMMUNICATION

(75) Inventors: Xiliang Luo, Northridge, CA (US); Peter Gaal, San Diego, CA (US); Wanshi Chen, San Diego, CA (US); Juan Montojo, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 184 days.

(21) Appl. No.: 13/171,270

(22) Filed: Jun. 28, 2011

(65) Prior Publication Data

US 2011/0317646 A1 Dec. 29, 2011

Related U.S. Application Data

(60) Provisional application No. 61/359,749, filed on Jun. 29, 2010.

(51) Int. Cl.
*H04J 3/24* (2006.01)

(52) U.S. Cl.
USPC .......................................... 370/349; 370/282

(58) Field of Classification Search
USPC ................. 370/349, 282, 235, 310, 319, 320, 370/321, 335, 337, 342, 344, 347
See application file for complete search history.

(56) References Cited

U.S. PATENT DOCUMENTS

| 8,243,850 | B2 * | 8/2012 | Khan | 375/296 |
| 2009/0241004 | A1 * | 9/2009 | Ahn et al. | 714/749 |
| 2012/0113938 | A1 * | 5/2012 | Larsson et al. | 370/329 |

OTHER PUBLICATIONS

Alcatel-Lucent Shanghai Bell et al: Cyclic Shift Mapping of PHICH Resources for UL MIMO, 3GPP Draft; R1-102796, 3rd Generation Partnership Project (3GPP), Mobile Competence Centre; 650, Route Des Lucioles; F-06921 Sophia-Antipolis Cedex; France, vol . RAN WG1, No. Montreal, Canada; 20100510, May 4, 2010, XP050419968, [retrieved on May 4, 2010].
International Search Report and Written Opinion-PCT/US2011/043440, International Search Authority—European Patent Office—Oct. 5, 2011.
Samsung: "ULSU-MIMO precoding in PHICH-triggered retransmissions" , 3GPP Draft; R1-103035 Precoding, 3rd Generation Partnership Project (3GPP), Mobile Competence Centre ; 650, Route Des Lucioles ; F-06921 Sophia-Antipolis Cedex ; France, vol. RAN WG1, No. Montreal, Canada; 20100510, May 4, 2010, XP050420128.
Zte: "Precoding for UL SU-MIMO in PHICH-triggered retransmission", 3GPP Draft; R1-103606 Precoding for ULSU-MIMO I N PHICH-Triggered Retransmission, 3rd Generation Partnership Project (3GPP), Mobile Competence Centre ; 650, Route Des Lucioles ; F-06921 Sophia-Antipolis Cedex ; France, vol. RAN WG1, No. Dresden, Germany; 20100628, Jun. 22, 2010, XP050449071.

* cited by examiner

*Primary Examiner* — Brenda H Pham
(74) *Attorney, Agent, or Firm* — Seyfarth Shaw LLP

(57) ABSTRACT

Provided is a method for wireless communication which includes transmitting codewords according to an initial transmission rank, receiving downlink transmissions indicating at least one of the codewords to be retransmitted, constructing a demodulation reference signal (DM-RS) to be sent with the at least one codeword to be retransmitted, and retransmitting the at least one codeword with the DM-RS according to a retransmission rank. The downlink transmissions may include one or more physical hybrid automatic retransmission request indicator channels and the DM-RS may be constructed based at least in part on information in the downlink transmissions.

62 Claims, 7 Drawing Sheets

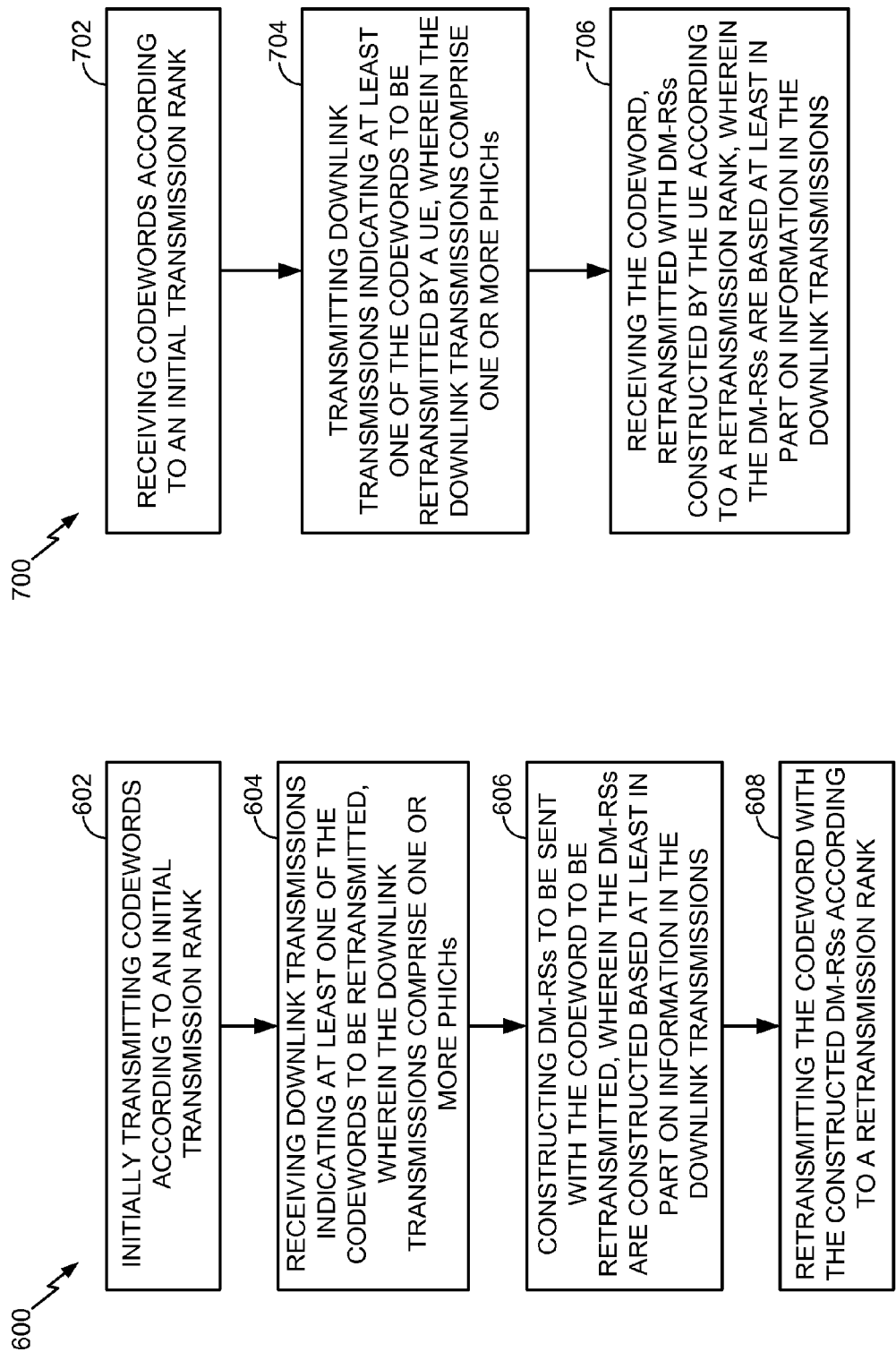

DEMODULATION REFERENCE SIGNALS FOR RETRANSMISSION IN WIRELESS COMMUNICATION

CROSS-REFERENCE TO RELATED APPLICATIONS

This application claims priority to U.S. Provisional Application Ser. No. 61/359,749, filed on Jun. 29, 2010, which is expressly incorporated by reference herein in its entirety.

BACKGROUND

I. Field

Certain aspects of the present disclosure generally relate to wireless communications and, more particularly, to constructing demodulation reference signals (DM-RS) for retransmission in wireless communication.

II. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include Code Division Multiple Access (CDMA) systems, Time Division Multiple Access (TDMA) systems, Frequency Division Multiple Access (FDMA) systems, 3rd Generation Partnership Project (3GPP) Long Term Evolution (LTE) systems and Orthogonal Frequency Division Multiple Access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

A MIMO system employs multiple (NT) transmit antennas and multiple (NR) receive antennas for data transmission. A MIMO channel formed by the NT transmit and NR receive antennas may be decomposed into NS independent channels, which are also referred to as spatial channels. Each of the NS independent channels corresponds to a dimension. The MIMO system can provide improved performance (e.g., higher throughput and/or greater reliability) when the additional dimensionalities created by the multiple transmit and receive antennas are utilized.

SUMMARY

Certain aspects of the present disclosure provide a method for wireless communications. The method generally includes transmitting first and second codewords according to an initial transmission rank, receiving downlink transmissions indicating at least one of the first and second codewords to be retransmitted, wherein the downlink transmissions include one or more physical hybrid automatic retransmission request indicator channels, constructing a demodulation reference signal (DM-RS) to be sent with the at least one codeword to be retransmitted, wherein the DM-RS is constructed based at least in part on information in the downlink transmissions, and retransmitting the at least one codeword with the DM-RS according to a retransmission rank.

Certain aspects of the present disclosure provide an apparatus for wireless communications. The apparatus generally includes means for transmitting first and second codewords according to an initial transmission rank, means for receiving downlink transmissions indicating at least one of the first and second codewords to be retransmitted, wherein the downlink transmissions include one or more physical hybrid automatic retransmission request indicator channels, means for constructing a demodulation reference signal (DM-RS) to be sent with the at least one codeword to be retransmitted, wherein the DM-RS is constructed based at least in part on information in the downlink transmissions, and means for retransmitting the at least one codeword with the DM-RS according to a retransmission rank.

Certain aspects of the present disclosure provide an apparatus for wireless communications. The apparatus generally includes at least one processor configured to transmit first and second codewords according to an initial transmission rank, to receive downlink transmissions indicating at least one of the first and second codewords to be retransmitted, wherein the downlink transmissions include one or more physical hybrid automatic retransmission request indicator channels, to construct a demodulation reference signal (DM-RS) to be sent with the at least one codeword to be retransmitted, wherein the DM-RS is constructed based at least in part on information in the downlink transmissions, and to retransmit the at least one codeword with the DM-RS according to a retransmission rank. The apparatus further includes a memory coupled to the at least one processor.

Certain aspects provide a computer-program product for wireless communications. The computer-program product includes a computer-readable medium having instructions stored thereon, the instructions being executable by one or more processors. The instructions generally include instructions for transmitting first and second codewords according to an initial transmission rank, instructions for receiving downlink transmissions indicating at least one of the first and second codewords to be retransmitted, wherein the downlink transmissions include one or more physical hybrid automatic retransmission request indicator channels, instructions for constructing a demodulation reference signal (DM-RS) to be sent with the at least one codeword to be retransmitted, wherein the DM-RS is constructed based at least in part on information in the downlink transmissions, and instructions for retransmitting the at least one codeword with the DM-RS according to a retransmission rank.

Certain aspects of the present disclosure provide a method for wireless communications. The method generally includes receiving first and second codewords according to an initial transmission rank, transmitting downlink transmissions indicating at least one of the first and second codewords to be retransmitted, wherein the downlink transmissions include one or more physical hybrid automatic retransmission request indicator channels, and receiving the at least one codeword retransmitted with a demodulation reference signals (DM-RS) according to a retransmission rank, wherein the DM-RS is based at least in part on information in the downlink transmissions.

Certain aspects of the present disclosure provide an apparatus for wireless communications. The apparatus generally includes means for receiving first and second codewords according to an initial transmission rank, means for transmitting downlink transmissions indicating at least one of the first and second codewords to be retransmitted, wherein the downlink transmissions include one or more physical hybrid automatic retransmission request indicator channels, and means for receiving the at least one codeword retransmitted with a demodulation reference signals (DM-RS) according to a retransmission rank, wherein the DM-RS is based at least in part on information in the downlink transmissions.

Certain aspects of the present disclosure provide an apparatus for wireless communications. The apparatus generally includes at least one processor configured to receive first and second codewords according to an initial transmission rank, to transmit downlink transmissions indicating at least one of the first and second codewords to be retransmitted, wherein the downlink transmissions include one or more physical hybrid automatic retransmission request indicator channels, and receive the at least one codeword, retransmitted with demodulation reference signals (DM-RSs) according to a retransmission rank, wherein the DM-RS is based at least in part on information in the downlink transmissions. The apparatus further includes a memory coupled to the at least one processor.

Certain aspects provide a computer-program product for wireless communications. The computer-program product typically includes a computer-readable medium having instructions stored thereon, the instructions being executable by one or more processors. The instructions generally include instructions for receiving first and second codewords according to an initial transmission rank, instructions for transmitting downlink transmissions indicating at least one of the first and second codewords to be retransmitted, wherein the downlink transmissions include one or more physical hybrid automatic retransmission request indicator channels, and instructions for receiving the at least one codeword retransmitted with a demodulation reference signals (DM-RS) according to a retransmission rank, wherein the DM-RS is based at least in part on information in the downlink transmissions.

BRIEF DESCRIPTION OF THE DRAWINGS

FIG. 6 illustrates example operations for constructing DM-RSs for retransmission of UL SU-MIMO, in accordance with certain aspects of the present disclosure.

FIG. 7 illustrates example operations for triggering retransmission of UL SU-MIMO, in accordance with certain aspects of the present disclosure.

DETAILED DESCRIPTION

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA), Time Division Synchronous CDMA (TD-SCDMA), and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A), in both frequency division duplexing (FDD) and time division duplexing (TDD), are new releases of UMTS that use E-UTRA, which employs OFDMA on the downlink and SC-FDMA on the uplink. UTRA, E-UTRA, UMTS, LTE, LTE-A and GSM are described in documents from 3GPP. cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
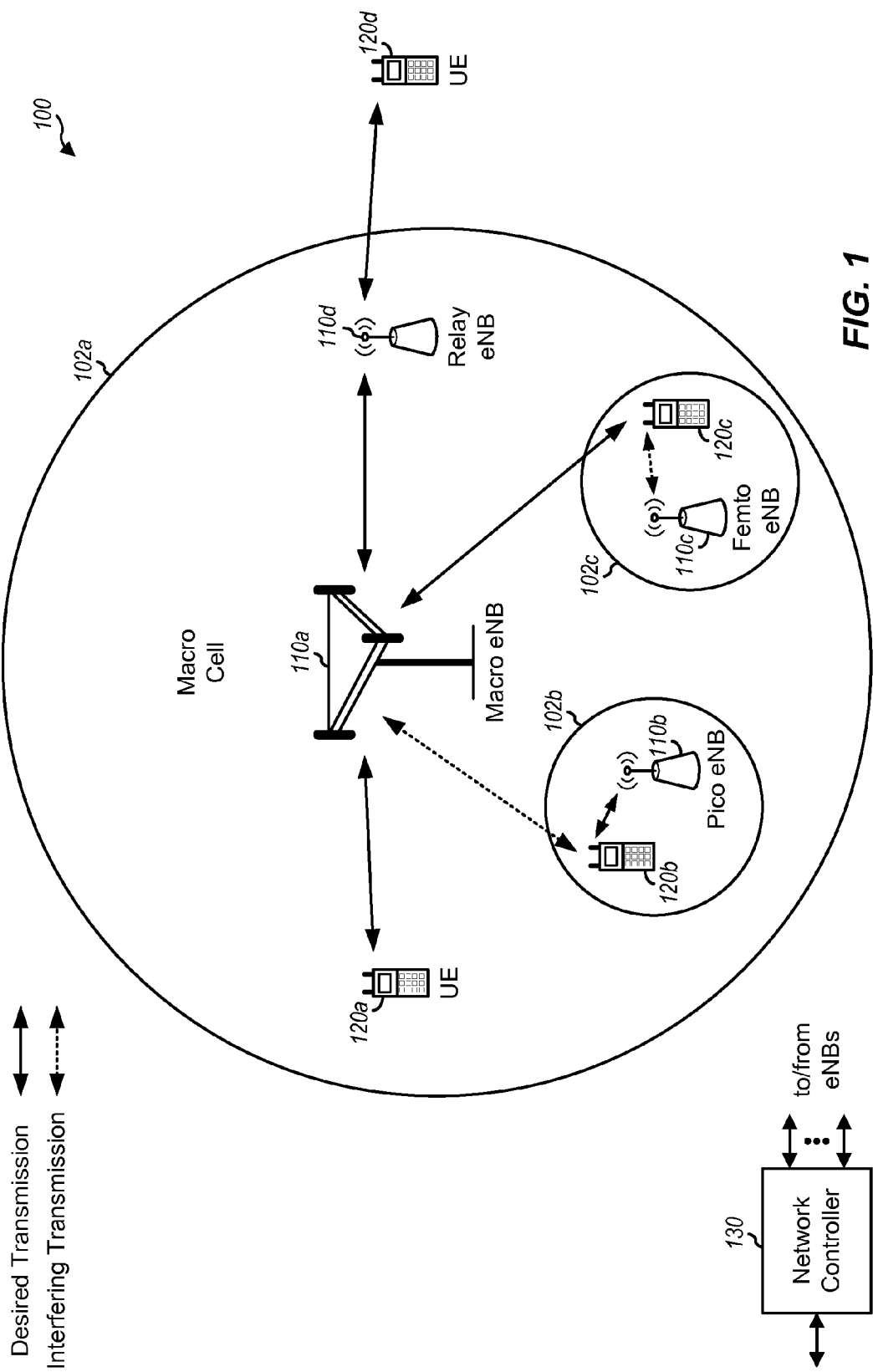
FIG. 1 is a block diagram conceptually illustrating an example of a wireless communication network, in accordance with certain aspects of the present disclosure.

FIG. 1 shows a wireless communication network 100, which may be an LTE network or some other wireless network. Wireless network 100 may include a number of evolved Node Bs (eNBs) 110 and other network entities. An eNB is an entity that communicates with UEs and may also be referred to as a base station, a Node B, an access point, etc. Each eNB may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG)). An eNB for a macro cell may be referred to as a macro eNB. An eNB for a pico cell may be referred to as a pico eNB. An eNB for a femto cell may be referred to as a femto eNB or a home eNB (HeNB). In the example shown in FIG. 1, an eNB 110a may be a macro eNB for a macro cell 102a, an eNB 110b may be a pico eNB for a pico cell 102b, and an eNB 110c may be a femto eNB for a femto cell 102c. An eNB may support one or multiple (e.g., three) cells. The terms "eNB", "base station" and "cell" may be used interchangeably herein.

Wireless network 100 may also include relay stations. A relay station is an entity that can receive a transmission of data from an upstream station (e.g., an eNB or a UE) and send a transmission of the data to a downstream station (e.g., a UE or an eNB). A relay station may also be a UE that can relay transmissions for other UEs. In the example shown in FIG. 1, a relay station 110d may communicate with macro eNB 110a and a UE 120d in order to facilitate communication between eNB 110a and UE 120d. A relay station may also be referred to as a relay eNB, a relay base station, a relay, etc.

Wireless network 100 may be a heterogeneous network that includes eNBs of different types, e.g., macro eNBs, pico eNBs, femto eNBs, relay eNBs, etc. These different types of eNBs may have different transmit power levels, different coverage areas, and different impact on interference in wireless network 100. For example, macro eNBs may have a high transmit power level (e.g., 5 to 40 Watts) whereas pico eNBs, femto eNBs, and relay eNBs may have lower transmit power levels (e.g., 0.1 to 2 Watts).

A network controller 130 may couple to a set of eNBs and may provide coordination and control for these eNBs. Network controller 130 may communicate with the eNBs via a backhaul. The eNBs may also communicate with one another, e.g., directly or indirectly via a wireless or wireline backhaul.

UEs 120 may be dispersed throughout wireless network 100, and each UE may be stationary or mobile. A UE may also be referred to as an access terminal, a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a smart phone, a netbook, a smartbook, a tablet, etc.

Figure 2:
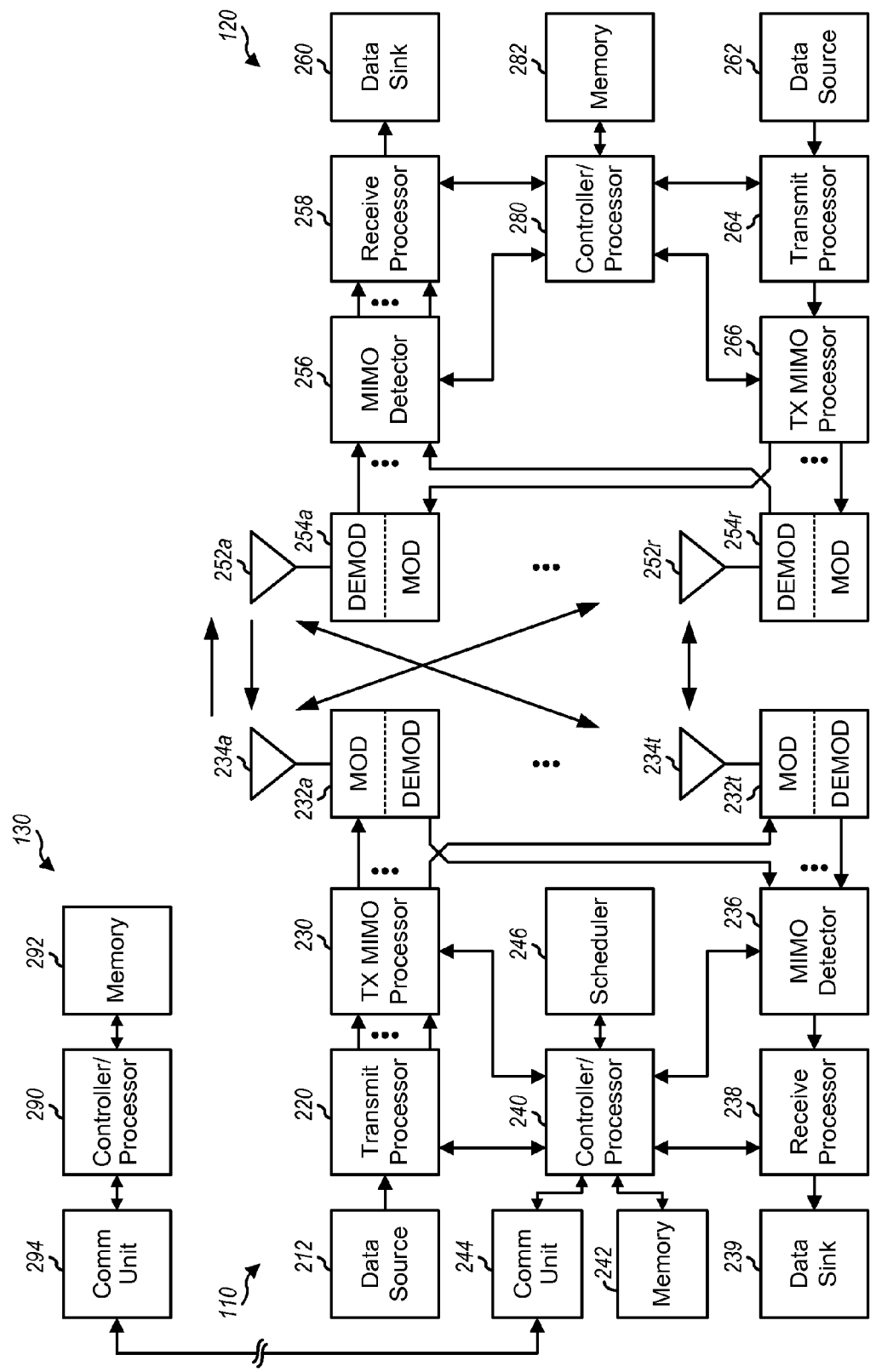
FIG. 2 is a block diagram conceptually illustrating an example of a base station in communication with a user equipment (UE) in a wireless communications network, in accordance with certain aspects of the present disclosure.

FIG. 2 shows a block diagram of a base station 110 and UE 120, which may be one of the eNBs and one of the UEs in FIG. 1. Base station 110 may be equipped with T antennas 234a through 234t, and UE 120 may be equipped with R antennas 252a through 252r, where in general $T \geq 1$ and $R \geq 1$.

At base station 110, a transmit processor 220 may receive data from a data source 212 for one or more UEs, select one or more modulation and coding schemes (MCS) for each UE based on CQIs received from the UE, process (e.g., encode and modulate) the data for each UE based on the MCS(s) selected for the UE, and provide data symbols for all UEs. Transmit processor 220 may also process system information (e.g., for SRPI, etc.) and control information (e.g., CQI requests, grants, upper layer signaling, etc.) and provide overhead symbols and control symbols. Processor 220 may also generate reference symbols for reference signals and synchronization signals. A transmit (TX) MIMO processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) its received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280.

On the uplink, at UE 120, a transmit processor 264 may receive and process data from a data source 262 and control information from controller/processor 280. Processor 264 may also generate reference symbols for one or more reference signals. The symbols from transmit processor 264 may be precoded by a TX MIMO processor 266 if applicable, further processed by modulators 254a through 254r (e.g., for SC-FDM, OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Processor 238 may provide the decoded data to a data sink 239 and the decoded control information to controller/processor 240.

Controllers/processors 240 and 280 and/or other processor and modules may direct the operation at base station 110 and UE 120, respectively. Memories 242 and 282 may store data and program codes for base station 110 and UE 120, respectively. A scheduler 244 may schedule UEs for data transmission on the downlink and/or uplink.

Figure 3:
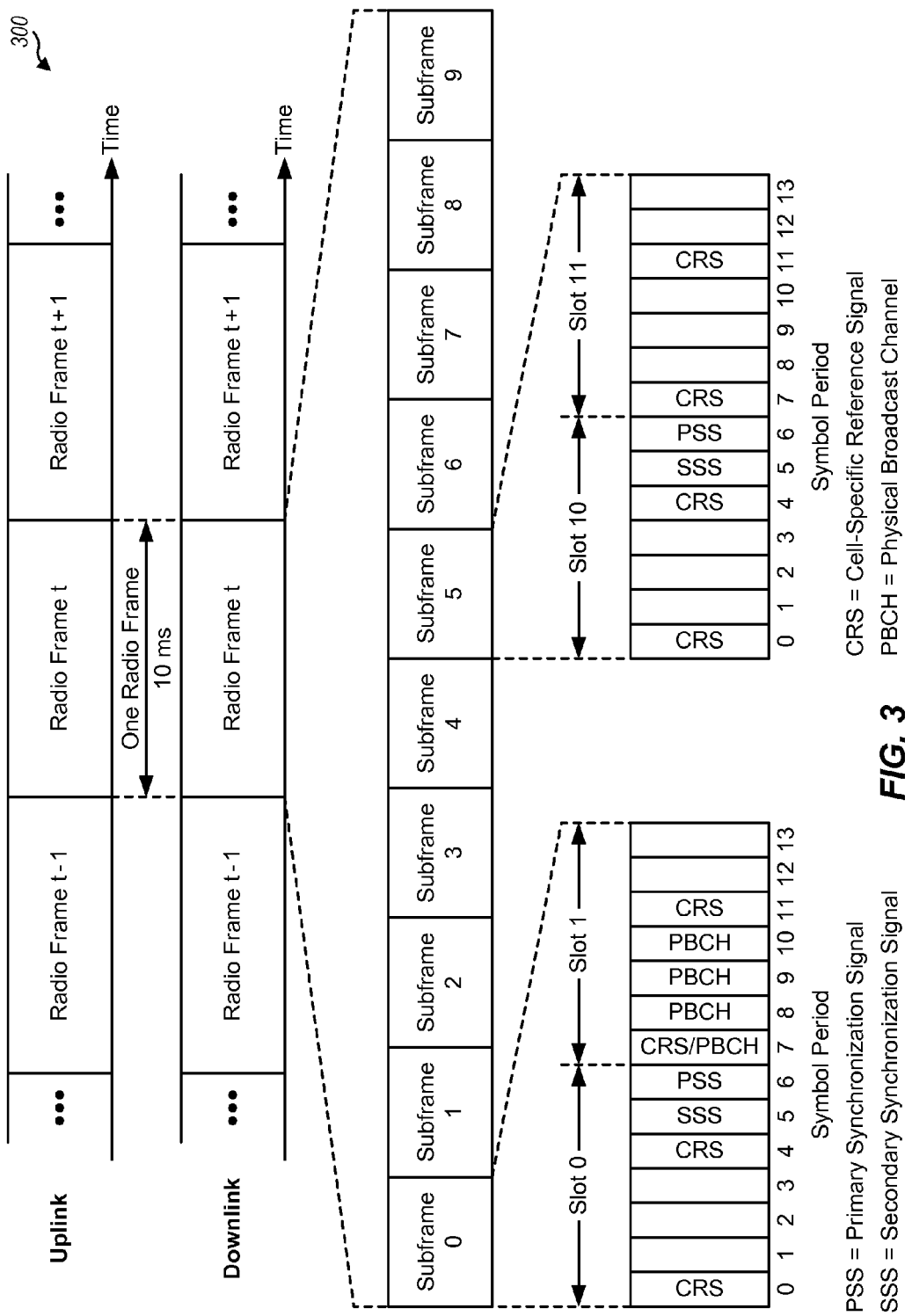
FIG. 3 is a block diagram conceptually illustrating an example of a frame structure in a wireless communications network, in accordance with certain aspects of the present disclosure.

FIG. 3 shows an exemplary frame structure 300 for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 2) or six symbol periods for an extended cyclic prefix. The 2L symbol periods in each subframe may be assigned indices of 0 through 2L−1.

In LTE, an eNB may transmit a primary synchronization signal (PSS) and a secondary synchronization signal (SSS) on the downlink in the center 1.08 MHz of the system bandwidth for each cell supported by the eNB. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The eNB may transmit a cell-specific reference signal (CRS) across the system bandwidth for each cell supported by the eNB. The CRS may be transmitted in certain symbol periods of each subframe and may be used by the UEs to perform channel estimation, channel quality measurement, and/or other functions. The eNB may also transmit a Physical Broadcast Channel (PBCH) in symbol periods 0 to 3 in slot 1 of certain radio frames. The PBCH may carry some system information. The eNB may transmit other system information such as System Information Blocks (SIBs) on a Physical Downlink Shared Channel (PDSCH) in certain subframes. The eNB may transmit control information/data on a Physical Downlink Control Channel (PDCCH) in the first B symbol periods of a subframe, where B may be configurable for each subframe. The eNB may transmit traffic data and/or other data on the PDSCH in the remaining symbol periods of each subframe.

Figure 4:
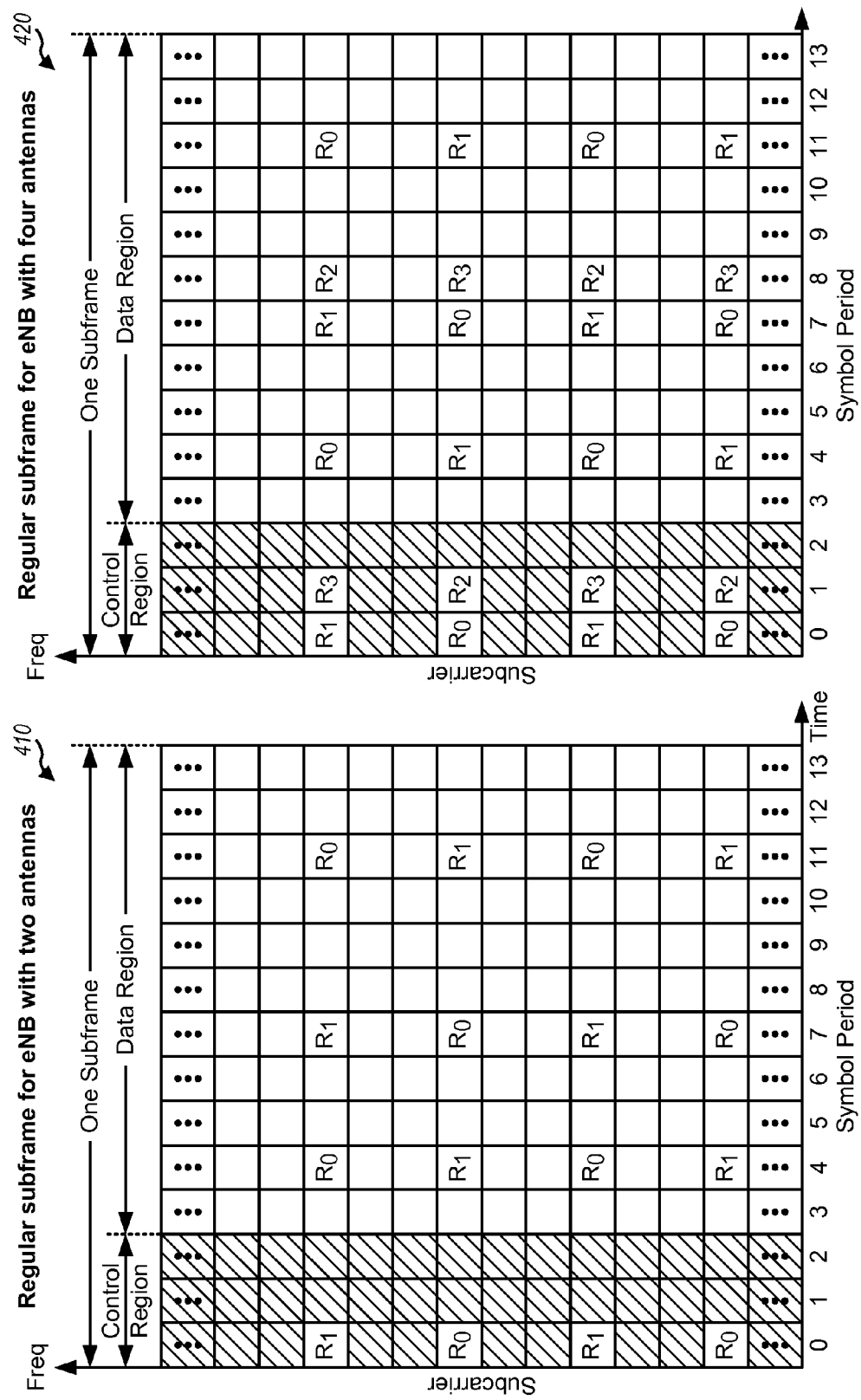
FIG. 4 illustrates two exemplary subframe formats for the downlink, in accordance with certain aspects of the present disclosure.

FIG. 4 shows two exemplary subframe formats 410 and 420 for the downlink with the normal cyclic prefix. The available time frequency resources for the downlink may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for an eNB equipped with two antennas. A CRS may be transmitted from antennas 0 and 1 in symbol periods 0, 4, 7 and 11. A reference signal is a signal that is known a priori by a transmitter and a receiver and may also be referred to as pilot. A CRS is a reference signal that is specific for a cell, e.g., generated based on a cell identity (ID). In FIG. 4, for a given resource element with label $R_a$, a modulation symbol may be transmitted on that resource element from antenna a, and no modulation symbols may be transmitted on that resource element from other antennas. Subframe format 420 may be used for an eNB equipped with four antennas. A CRS may be transmitted from antennas 0 and 1 in symbol periods 0, 4, 7 and 11 and from antennas 2 and 3 in symbol periods 1 and 8. For both subframe formats 410 and 420, a CRS may be transmitted on evenly spaced subcarriers, which may be determined based on cell ID. Different eNBs may transmit their CRSs on the same or different subcarriers, depending on their cell IDs. For both subframe formats 410 and 420, resource elements not used for the CRS may be used to transmit data (e.g., traffic data, control data, and/or other data).

An interlace structure may be used for each of the downlink and uplink for FDD in LTE. For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where q∈ $\{0, \ldots, Q-1\}$.

The wireless network may support hybrid automatic retransmission request (HARQ) for data transmission on the downlink and uplink. For HARQ, a transmitter may send one or more transmissions of a packet until the packet is decoded correctly by a receiver or some other termination condition is encountered. For synchronous HARQ, all transmissions of the packet may be sent in subframes of a single interlace. For asynchronous HARQ, each transmission of the packet may be sent in any subframe.

In LTE-A, MIMO transmission may be supported in the uplink from a single user (i.e., UL SU-MIMO). For some embodiments, up to rank-4 (i.e., four spatial layers) transmission may be possible from a single UE. Codeword (CW) (or transport block) to layer mapping may follow the same principle as in LTE Rel-8 downlink. For example, for rank-2 transmission, CW0 may be mapped to layer 0 and CW1 may be mapped to layer 1. For rank-3 transmission, CW0 may be mapped to layer 0 and CW1 may be mapped to layers 1 and 2. For rank-4 transmission, CW0 may be mapped to layers 0 and 1, and CW1 may be mapped to layers 2 and 3. There may be different demodulation reference signal (DM-RS) construction rules for different ranks, wherein the DM-RS multiplexing performance for each rank may be optimized. Cyclic shift and orthogonal cover code (OCC) for each layer, for example, may be derived from information signaled in a PDCCH scheduling grant. According to embodiments of the present disclosure, retransmission may be triggered either adaptively or non-adaptively. For some embodiments, adaptive retransmission (e.g., changing the transmission bandwidth and/or rate) may be scheduled by a PDCCH grant and non-adaptive retransmission may be triggered by one or more physical hybrid automatic retransmission request indicator channels (PHICHs).

Figure 5:
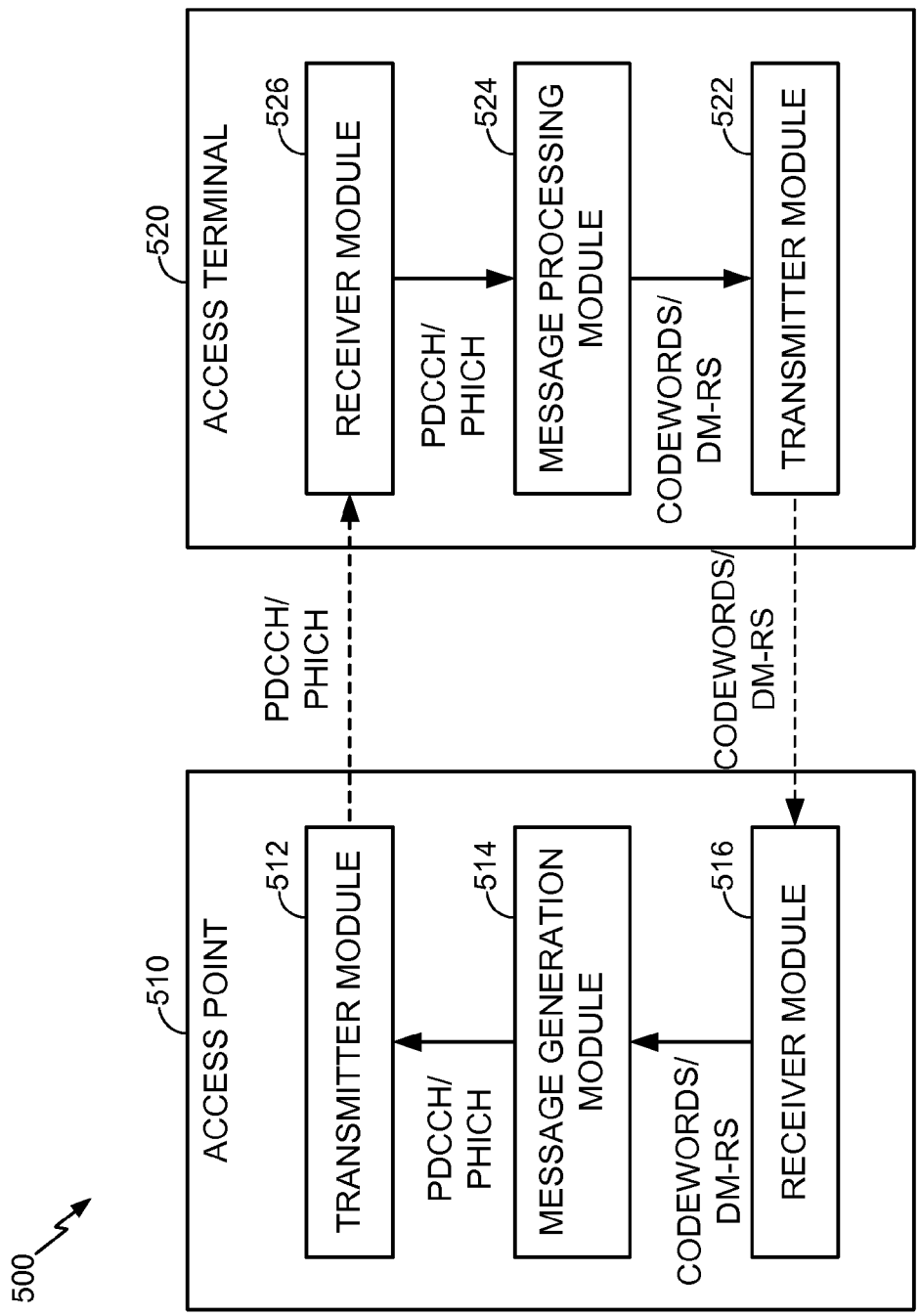
FIG. 5 illustrates an example system with an access point and an access terminal, capable of constructing demodulation reference signals (DM-RSs) for retransmission of uplink (UL) single-user MIMO (SU-MIMO), in accordance with certain aspects of the present disclosure.

FIG. 5 illustrates an example system 500 with an access point 510 (e.g., eNB) and an access terminal 520 (e.g., a UE), capable of constructing one or more DM-RSs for retransmission of UL SU-MIMO, in accordance with certain aspects of the present disclosure. As illustrated, the access point 510 may include a message generation module 514 for generating one or more messages (e.g., PDCCH/PHICH), wherein the message may be transmitted in a downlink subframe, via a transmitter module 512, to the access terminal 520. As mentioned above, retransmission may be triggered either adaptively or non-adaptively, where adaptive retransmission may be scheduled by a PDCCH and non-adaptive retransmission may be triggered by one or more PHICHs, as will be discussed further herein.

The access terminal 520 may receive the message via a receiver module 526 and process the message (e.g., based on either adaptive or non-adaptive retransmission) via a message processing module 524. After receiving and processing the message indicating at least one codeword to be retransmitted, the access terminal 520 may construct DM-RSs to be sent with the at least one codeword to be retransmitted, wherein the DM-RSs are constructed based at least in part on information in the message, as will be discussed further herein. The access terminal 520 may retransmit the at least one codeword with the constructed DM-RSs, via a transmitter module 522, to the access point 510 in an uplink subframe. The access point 510 may receive the retransmission via a receiver module 516.

FIG. 6 illustrates example operations 600 for constructing DM-RSs for retransmission of uplink MIMO, in accordance with certain aspects of the present disclosure. The operations 600 may be performed, for example, by a UE. At 602, the UE may initially transmit at least first and second codewords according to an initial transmission rank.

At 604, the UE may receive downlink transmissions indicating at least one of the first and second codewords to be retransmitted, wherein the downlink transmissions may comprise one or more PHICHs. As described above, retransmission may be triggered either adaptively or non-adaptively, where adaptive retransmission may be scheduled by a PDCCH and non-adaptive retransmission may be triggered by the one or more PHICHs.

At 606, the UE may construct DM-RSs to be sent with the at least one codeword to be retransmitted, wherein the DM-RSs may be constructed based at least in part on information in the downlink transmissions. At 608, the UE may retransmit the at least one codeword with the constructed DM-RSs according to a retransmission rank. For some embodiments, the initial transmission rank and the retransmission rank may be different.

FIG. 7 illustrates example operations 700 for triggering retransmission of UL SU-MIMO, in accordance with certain aspects of the present disclosure. The operations 700 may be performed, for example, by an eNB. At 702, the BS may receive at least first and second codewords according to an initial transmission rank. At 704, the eNB may transmit downlink transmissions indicating at least one of the first and second codewords to be retransmitted by a UE, wherein the downlink transmissions may comprise one or more PHICHs. At 706, the eNB may receive the at least one codeword, retransmitted with DM-RSs constructed by the UE according to a retransmission rank, wherein the DM-RSs may be based at least in part on information in the downlink transmissions.

Figure 8A:
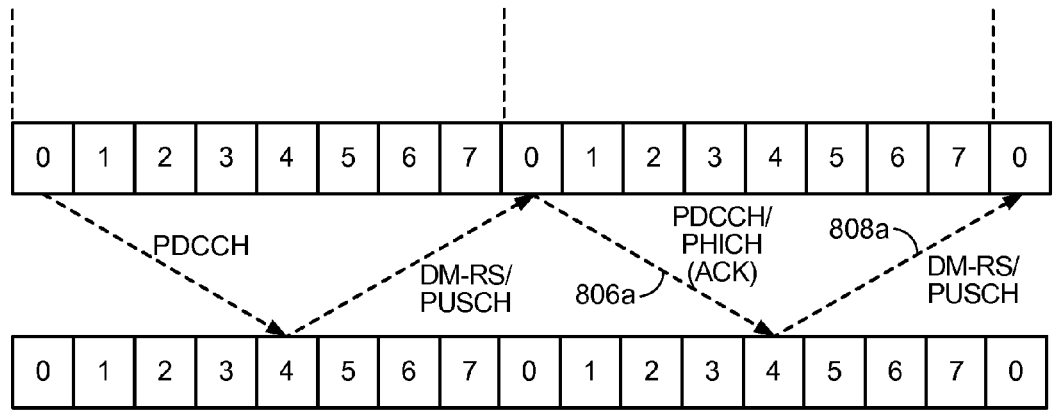
FIGS. 8A and 8B illustrate embodiments of adaptive and non-adaptive retransmission of UL SU-MIMO, respectively, in accordance with certain aspects of the present disclosure.

FIG. 8A illustrates an embodiment of adaptive retransmission of UL SU-MIMO, in accordance with certain aspects of the present disclosure. As illustrated, adaptive retransmission may be triggered by a PDCCH grant transmitted at 806a. The signaled information in the PDCCH grant may be followed to construct the DM-RS for a retransmission at 808a. For example, cyclic shift and orthogonal cover code (OCC) for each layer may be derived from information signaled in the PDCCH grant transmitted at 806a. The transmission rank for the retransmission may be different from the transmission rank of the initial transmission. For some embodiments, the DM-RSs may be constructed according to a rule associated with the retransmission rank.

For some embodiments, one or more PHICHs may be sent together with the PDCCH grant at 806a for the one or more codewords that are to be retransmitted, wherein the PHICH(s) may indicate acknowledgment (ACK) to the UE instead of negative acknowledgment (NACK). As a result, the UE may not perform retransmission unless a valid PDCCH grant is decoded. Sending the PHICH(s) together with the PDCCH grant may avoid the potential problem in case the PDCCH grant is missed. For example, if the PHICHs indicated NACK to the UE and the PDCCH grant scheduling the retransmission (at 806a) is somehow not detected at the UE, the UE may perform PHICH-triggered retransmission, which may potentially create severe interference to other uplink channels.

Figure 8B:
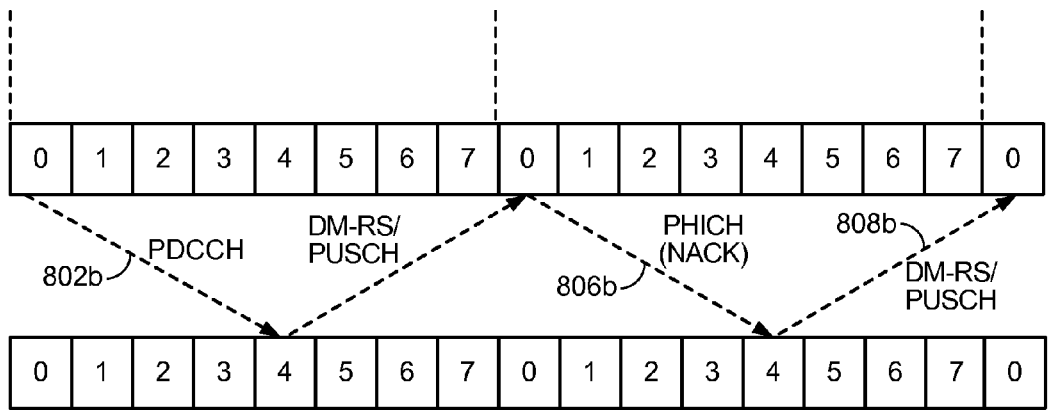

FIG. 8B illustrates an embodiment of non-adaptive retransmission of UL SU-MIMO, in accordance with certain aspects of the present disclosure. As illustrated, non-adaptive retransmission may be triggered by one or more PHICHs transmitted at 806b, wherein at least one of the PHICHs may indicate a NACK for the at least one codeword to be retransmitted (i.e., there is one PHICH for each of the codewords in PUSCH). For some embodiments, in order to construct the DM-RS for a retransmission of rank R at 808b, the signaled information in a previous PDCCH assignment, for example, transmitted at 802b, may be totally followed for retransmitting codeword(s). For some embodiments, the followed PDCCH assignment may be an initial assignment, or the most recent or latest assignment, or any previous assignment. The PDCCH assignment may include an uplink (UL) grant for the UE. Even though the transmission rank in the retransmission may be different from the one signaled in the followed PDCCH assignment transmitted at 802b, the rank signaled in the followed PDCCH assignment (Q) may be utilized for DM-RS construction purposes. The DM-RS may be constructed for the corresponding R layers according to the DM-RS construction rule for rank Q, where $Q \geq R$.

For some embodiments, in order to construct the DM-RS for a retransmission of rank R at 808b, the signaled information in a previous PDCCH assignment (e.g., transmitted at 802b) may be partly followed for retransmitting codeword(s). The followed PDCCH assignment may be an initial assignment, or the most recent or latest assignment, or any previous assignment. The PDCCH assignment may include an uplink (UL) grant for the UE. The DM-RS may be constructed for the corresponding R layers according to the DM-RS construction rule for rank R. Other needed information for DM-RS construction may be derived from the followed PDCCH assignment. For some embodiments, a PHICH may be transmitted from the BS for each codeword.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in Figures, those operations may be performed by any suitable corresponding counterpart means-plus-function components.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and features disclosed herein.

What is claimed is:

1. A method for wireless communications, comprising:
transmitting first and second codewords according to an initial transmission rank;
receiving downlink transmissions indicating at least one of the first and second codewords to be retransmitted, wherein the downlink transmissions include one or more physical hybrid automatic retransmission request indicator channels (PHICHs);
constructing a demodulation reference signal (DM-RS) to be sent with the at least one codeword to be retransmitted, wherein the DM-RS is constructed based at least in part on information in the downlink transmissions; and
retransmitting the at least one codeword with the DM-RS according to a retransmission rank.

2. The method of claim 1, wherein the initial transmission rank and the retransmission rank are different.

3. The method of claim 1, wherein at least one of the one or more PHICHs include a negative acknowledgment (NACK) indicating the at least one codeword to be retransmitted.

4. The method of claim 3, wherein the constructing includes constructing the DM-RS based at least in part on information in a followed physical downlink control channel (PDCCH) grant.

5. The method of claim 4, wherein the followed PDCCH grant includes one of an initial PDCCH grant for the first and second codewords and a latest PDCCH grant.

6. The method of claim 4, wherein the DM-RS is constructed based at least in part on a rule associated with the retransmission rank and the information in the followed PDCCH grant;
wherein the information in the followed PDCCH grant includes one of a cyclic shift and an orthogonal cover code.

7. The method of claim 1, wherein the receiving the downlink transmissions includes receiving a physical downlink control channel (PDCCH) grant indicating the at least one codeword to be retransmitted.

8. The method of claim 7, wherein the constructing includes constructing the DM-RS based at least in part on information in the PDCCH grant.

9. The method of claim 8, wherein at least one of the one or more PHICHs indicate an acknowledgment (ACK) for the at least one codeword to be retransmitted.

10. The method of claim 8, wherein the information in the PDCCH grant includes one of a cyclic shift and an orthogonal cover code.

11. The method of claim 8, wherein the constructing includes constructing the DM-RS according to a rule associated with the retransmission rank.

12. An apparatus for wireless communications, comprising:
means for transmitting first and second codewords according to an initial transmission rank;
means for receiving downlink transmissions indicating at least one of the first and second codewords to be retransmitted, wherein the downlink transmissions include one or more physical hybrid automatic retransmission request indicator channels (PHICHs);
means for constructing a demodulation reference signal (DM-RS) to be sent with the at least one codeword to be retransmitted, wherein the DM-RS is constructed based at least in part on information in the downlink transmissions; and
means for retransmitting the at least one codeword with the DM-RS according to a retransmission rank.

13. The apparatus of claim 12, wherein the initial transmission rank and the retransmission rank are different.

14. The apparatus of claim 12, wherein at least one of the one or more PHICHs include a negative acknowledgment (NACK) indicating the at least one codeword to be retransmitted.

15. The apparatus of claim 14, wherein the means for constructing includes means for constructing the DM-RS based at least in part on information in a followed physical downlink control channel (PDCCH) grant.

16. The apparatus of claim 15, wherein the followed PDCCH grant includes one of an initial PDCCH grant for the first and second codewords and a latest PDCCH grant.

17. The apparatus of claim 15, wherein the DM-RS is constructed based at least in part on a rule associated with the retransmission rank and the information in the followed PDCCH grant;
wherein the information in the followed PDCCH grant includes one of a cyclic shift and an orthogonal cover code.

18. The apparatus of claim 12, wherein the means for receiving the downlink transmissions includes means for receiving a physical downlink control channel (PDCCH) grant indicating the at least one codeword to be retransmitted.

19. The apparatus of claim 18, wherein the means for constructing includes means for constructing the DM-RS based at least in part on information in the PDCCH grant.

20. The apparatus of claim 19, wherein at least one of the one or more PHICHs indicate an acknowledgment (ACK) for the at least one codeword to be retransmitted.

21. The apparatus of claim 19, wherein the information in the PDCCH grant includes one of a cyclic shift and an orthogonal cover code.

22. The apparatus of claim 19, wherein the means for constructing includes means for constructing the DM-RS according to a rule associated with the retransmission rank.

23. An apparatus for wireless communications, comprising:
at least one processor configured to transmit first and second codewords according to an initial transmission rank, to receive downlink transmissions indicating at least one of the first and second codewords to be retransmitted, wherein the downlink transmissions include one or more physical hybrid automatic retransmission request indicator channels (PHICHs), to construct a demodulation reference signal (DM-RS) to be sent with the at least one codeword to be retransmitted, wherein the DM-RS is constructed based at least in part on information in the downlink transmissions, and to retransmit the at least one codeword with the DM-RS according to a retransmission rank; and
a memory coupled to the at least one processor.

24. The apparatus of claim 23, wherein the initial transmission rank and the retransmission rank are different.

25. The apparatus of claim 23, wherein at least one of the one or more PHICHs include a negative acknowledgment (NACK) indicating the at least one codeword to be retransmitted.

26. The apparatus of claim 25, wherein the DM-RS is constructed based at least in part on information in a followed physical downlink control channel (PDCCH) grant.

27. The apparatus of claim 26, wherein the followed PDCCH grant includes one of an initial PDCCH grant for the first and second codewords and a latest PDCCH grant.

28. The apparatus of claim 26, wherein the DM-RS is constructed based at least in part on a rule associated with the retransmission rank and the information in the followed PDCCH grant;
   wherein the information in the followed PDCCH grant includes one of a cyclic shift and an orthogonal cover code.

29. A computer-program product, comprising:
   a computer-readable medium comprising:
      instructions for transmitting first and second codewords according to an initial transmission rank;
      instructions for receiving downlink transmissions indicating at least one of the first and second codewords to be retransmitted, wherein the downlink transmissions include one or more physical hybrid automatic retransmission request indicator channels (PHICHs);
      instructions for constructing a demodulation reference signal (DM-RS) to be sent with the at least one codeword to be retransmitted, wherein the DM-RS is constructed based at least in part on information in the downlink transmissions; and
      instructions for retransmitting the at least one codeword with the DM-RS according to a retransmission rank.

30. The computer-program product of claim 29, wherein at least one of the one or more PHICHs include a negative acknowledgment (NACK) indicating the at least one codeword to be retransmitted;
   wherein the DM-RS is constructed based at least in part on information in a followed physical downlink control channel (PDCCH) grant.

31. The computer-program product of claim 30, wherein the followed PDCCH grant includes one of an initial PDCCH grant for the first and second codewords and a latest PDCCH grant;
   wherein the DM-RS is constructed based at least in part on a rule associated with the retransmission rank and the information in the followed PDCCH grant;
   wherein the information in the followed PDCCH grant includes one of a cyclic shift and an orthogonal cover code.

32. The computer-program product of claim 29, wherein the downlink transmissions include a physical downlink control channel (PDCCH) grant indicating the at least one codeword to be retransmitted;
   wherein the DM-RS is constructed based at least in part on information in the PDCCH grant;
   wherein at least one of the one or more PHICHs indicate an acknowledgment (ACK) for the at least one codeword to be retransmitted.

33. A method for wireless communications, comprising:
   receiving first and second codewords according to an initial transmission rank;
   transmitting downlink transmissions indicating at least one of the first and second codewords to be retransmitted, wherein the downlink transmissions include one or more physical hybrid automatic retransmission request indicator channels (PHICHs); and
   receiving the at least one codeword retransmitted with a demodulation reference signal (DM-RS) according to a retransmission rank, wherein the DM-RS is based at least in part on information in the downlink transmissions.

34. The method of claim 33, wherein the initial transmission rank and the retransmission rank are different.

35. The method of claim 33, wherein at least one of the one or more PHICHs include a negative acknowledgment (NACK) indicating the at least one codeword to be retransmitted.

36. The method of claim 35, wherein the DM-RS is based at least in part on information in a followed physical downlink control channel (PDCCH) grant.

37. The method of claim 36, wherein the followed PDCCH grant includes one of an initial PDCCH grant for the first and second codewords and a latest PDCCH grant.

38. The method of claim 36, wherein the DM-RS is based at least in part on a rule associated with the retransmission rank and the information in the followed PDCCH grant;
   wherein the information in the followed PDCCH grant includes one of a cyclic shift and an orthogonal cover code for the DM-RS.

39. The method of claim 33, wherein the transmitting the downlink transmissions includes transmitting a physical downlink control channel (PDCCH) grant indicating the at least one codeword to be retransmitted.

40. The method of claim 39, wherein the DM-RS is based at least in part on information in the PDCCH grant.

41. The method of claim 40, wherein at least one of the one or more PHICHs indicate an acknowledgment (ACK) for the at least one codeword to be retransmitted by the UE.

42. The method of claim 40, wherein the information in the PDCCH grant includes one of a cyclic shift and an orthogonal cover code for the DM-RS.

43. The method of claim 40, wherein the DM-RS is based at least in part on a rule associated with the retransmission rank.

44. An apparatus for wireless communications, comprising:
   means for receiving first and second codewords according to an initial transmission rank;
   means for transmitting downlink transmissions indicating at least one of the first and second codewords to be retransmitted, wherein the downlink transmissions include one or more physical hybrid automatic retransmission request indicator channels (PHICHs); and
   means for receiving the at least one codeword retransmitted with a demodulation reference signal (DM-RS) according to a retransmission rank, wherein the DM-RS is based at least in part on information in the downlink transmissions.

45. The apparatus of claim 44, wherein the initial transmission rank and the retransmission rank are different.

46. The apparatus of claim 44, wherein at least one of the one or more PHICHs include a negative acknowledgment (NACK) indicating the at least one codeword to be retransmitted.

47. The apparatus of claim 46, wherein the DM-RS is based at least in part on information in a followed physical downlink control channel (PDCCH) grant.

48. The apparatus of claim 47, wherein the followed PDCCH grant includes one of an initial PDCCH grant for the first and second codewords and a latest PDCCH grant.

49. The apparatus of claim 47, wherein the DM-RS is based at least in part on a rule associated with the retransmission rank and the information in the followed PDCCH grant;
   wherein the information in the followed PDCCH grant includes one of a cyclic shift and an orthogonal cover code for the DM-RS.

50. The apparatus of claim 44, wherein the means for transmitting the downlink transmissions includes means for transmitting a physical downlink control channel (PDCCH) grant indicating the at least one codeword to be retransmitted.

51. The apparatus of claim 50, wherein the DM-RS is based at least in part on information in the PDCCH grant.

52. The apparatus of claim 51, wherein at least one of the one or more PHICHs indicate an acknowledgment (ACK) for the at least one codeword to be retransmitted.

53. The apparatus of claim 51, wherein the information in the PDCCH grant includes one of a cyclic shift and an orthogonal cover code.

54. The apparatus of claim 51, wherein the DM-RS is based at least in part on a rule associated with the retransmission rank.

55. An apparatus for wireless communications, comprising:
at least one processor configured to receive first and second codewords according to an initial transmission rank, to transmit downlink transmissions indicating at least one of the first and second codewords to be retransmitted, wherein the downlink transmissions include one or more physical hybrid automatic retransmission request indicator channels (PHICHs), and to receive the at least one codeword retransmitted with a demodulation reference signal (DM-RS) according to a retransmission rank, wherein the DM-RS is based at least in part on information in the downlink transmissions; and
a memory coupled to the at least one processor.

56. The apparatus of claim 55, wherein at least one of the one or more PHICHs include a negative acknowledgment (NACK) indicating the at least one codeword to be retransmitted;
wherein the DM-RS is based at least in part on information in a followed physical downlink control channel (PDCCH) grant.

57. The apparatus of claim 56, wherein the followed PDCCH grant includes one of an initial PDCCH grant for the first and second codewords and a latest PDCCH grant;
wherein the DM-RS is based at least in part on a rule associated with the retransmission rank and the information in the followed PDCCH grant;
wherein the information in the followed PDCCH grant includes one of a cyclic shift and an orthogonal cover code for the DM-RS.

58. The apparatus of claim 55, wherein the downlink transmissions include a physical downlink control channel (PDCCH) grant indicating the at least one codeword to be retransmitted;
wherein the DM-RS is based at least in part on information in the PDCCH grant;
wherein at least one of the one or more PHICHs indicate an acknowledgment (ACK) for the at least one codeword to be retransmitted.

59. A computer-program product, comprising:
a computer-readable medium comprising:
instructions for receiving at least first and second codewords according to an initial transmission rank;
instructions for transmitting downlink transmissions indicating at least one of the first and second codewords to be retransmitted, wherein the downlink transmissions comprise one or more physical hybrid automatic retransmission request indicator channels (PHICHs); and
instructions for receiving the at least one codeword retransmitted with a demodulation reference signal (DM-RS) according to a retransmission rank, wherein the DM-RS is based at least in part on information in the downlink transmissions.

60. The computer-program product of claim 59, wherein at least one of the one or more PHICHs include a negative acknowledgment (NACK) indicating the at least one codeword to be retransmitted;
wherein the DM-RS is based at least in part on information in a followed physical downlink control channel (PDCCH) grant.

61. The computer-program product of claim 60, wherein the followed PDCCH grant includes one of an initial PDCCH grant for the first and second codewords and a latest PDCCH grant;
wherein the DM-RS is based at least in part on a rule associated with the retransmission rank and the information in the followed PDCCH grant;
wherein the information in the followed PDCCH grant includes one of a cyclic shift and an orthogonal cover code for the DM-RS.

62. The computer-program product of claim 59, wherein the downlink transmissions include a physical downlink control channel (PDCCH) grant indicating the at least one codeword to be retransmitted;
wherein the DM-RS is based at least in part on information in the PDCCH grant;
wherein at least one of the one or more PHICHs indicate an acknowledgment (ACK) for the at least one codeword to be retransmitted.

* * * * *